United States Patent [19]

Lee et al.

[11] 4,102,557
[45] Jul. 25, 1978

[54] COLLAPSIBLE CONTAINER

[75] Inventors: Walter Lee, Springfield, Va.; Kenneth C. Litt, Silver Spring, Md.

[73] Assignee: Pace Incorporated, Silver Spring, Md.

[21] Appl. No.: 773,290

[22] Filed: Mar. 1, 1977

[51] Int. Cl.$^2$ .................... B65D 7/00; A47B 43/00
[52] U.S. Cl. .................... 312/257 R; 312/257 A; 312/264; 220/4 F; 220/DIG. 25
[58] Field of Search ..... 312/257 R, 257 SK, 257 SM, 312/257 A, 140, 210, 100, 264, 258; 220/4 F, DIG. 25

[56] References Cited

U.S. PATENT DOCUMENTS

| 881,785 | 3/1908 | Flora | 312/258 |
|---|---|---|---|
| 1,828,088 | 10/1931 | Robinson | 220/75 |
| 1,909,136 | 5/1933 | Thomas, Jr. | 312/257 R |
| 2,421,225 | 5/1947 | Stensgaard | 220/4 E |
| 2,488,710 | 11/1949 | Cooper | 220/DIG. 25 |
| 3,844,634 | 10/1974 | Kruger et al. | 312/257 R |
| 3,950,603 | 4/1976 | Brefka | 220/DIG. 25 |

FOREIGN PATENT DOCUMENTS

| 9,560 of | 1905 | United Kingdom | 220/DIG. 25 |

Primary Examiner—Paul R. Gilliam
Assistant Examiner—Victor N. Sakran
Attorney, Agent, or Firm—Gerald J. Ferguson, Jr.; Joseph J. Baker

[57] ABSTRACT

A collapsible container having two channel-like members which mate with one another to form an enclosure and two U-shaped brackets having inwardly facing grooves for receiving the edges of the channel-like members to secure them together. A method for forming the channel-like members from sheet metal or the like and the U-shaped members from elongated bars.

3 Claims, 9 Drawing Figures

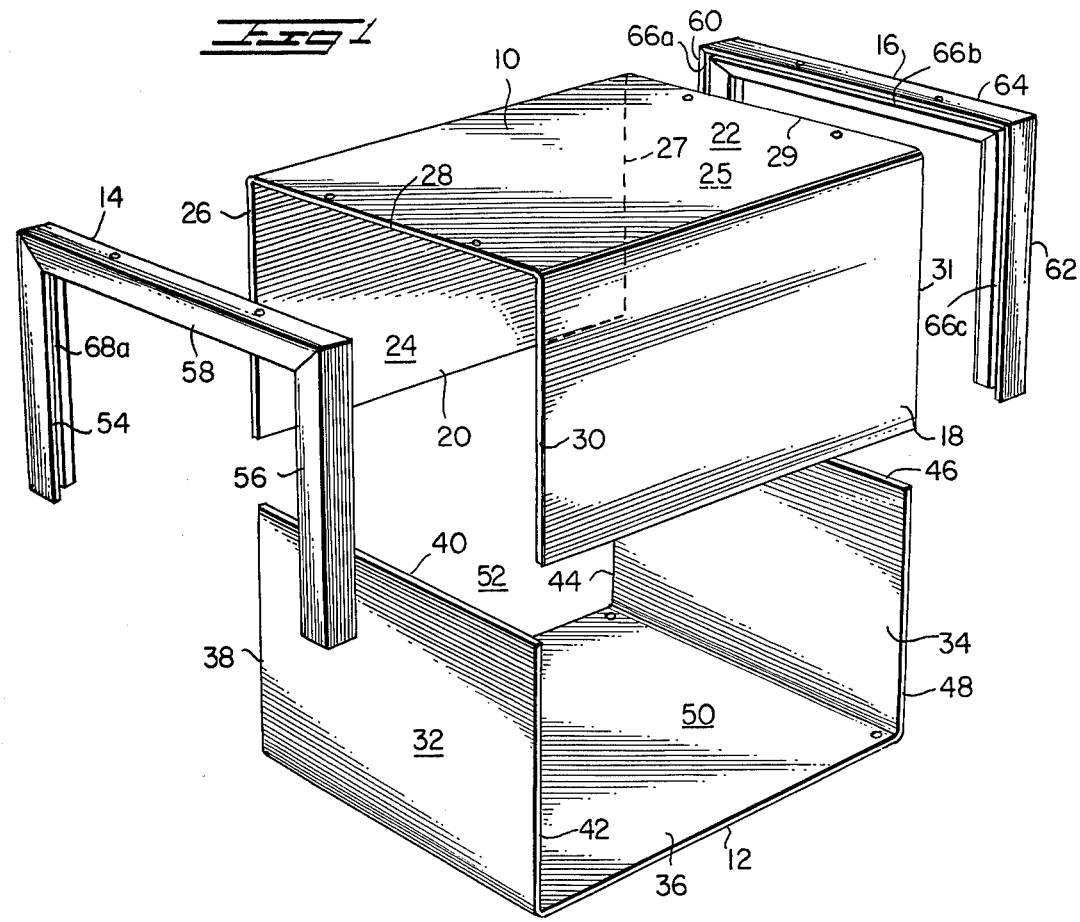
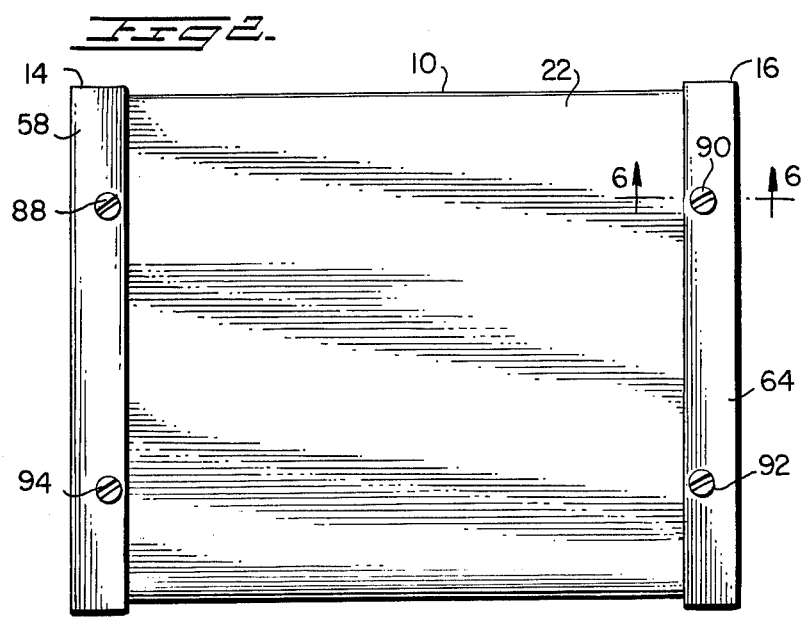

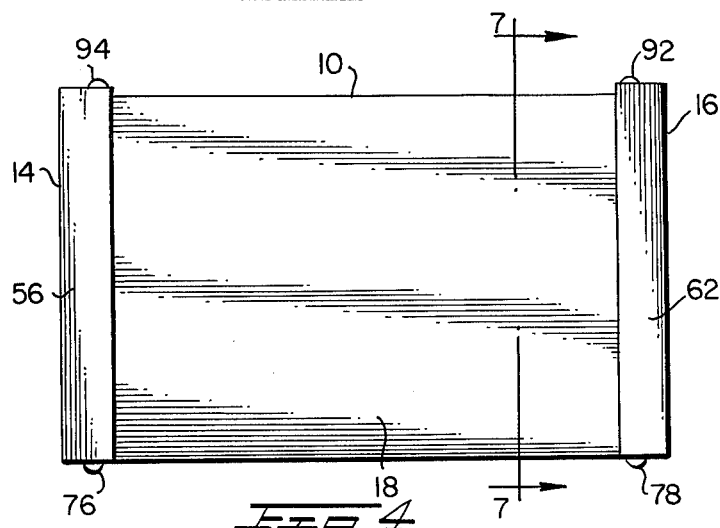
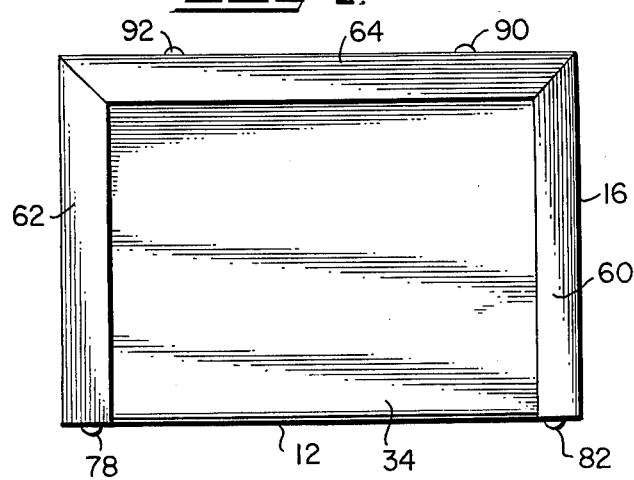
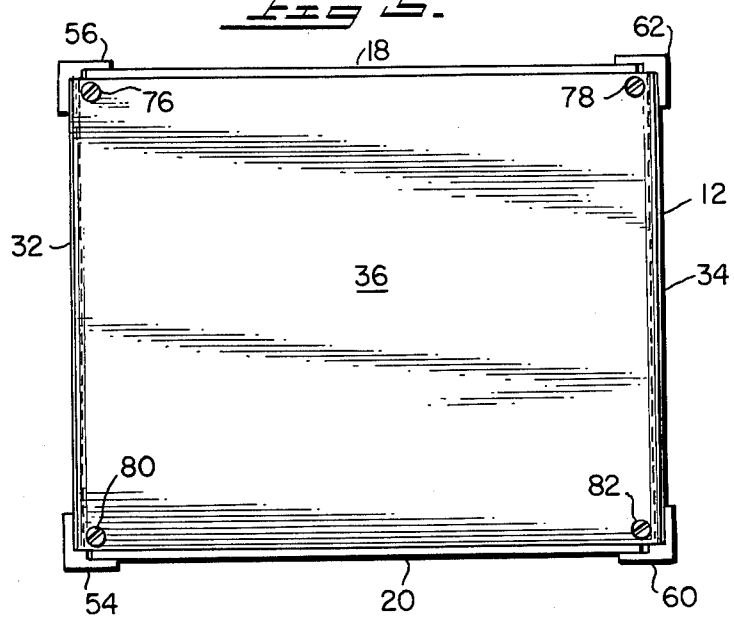

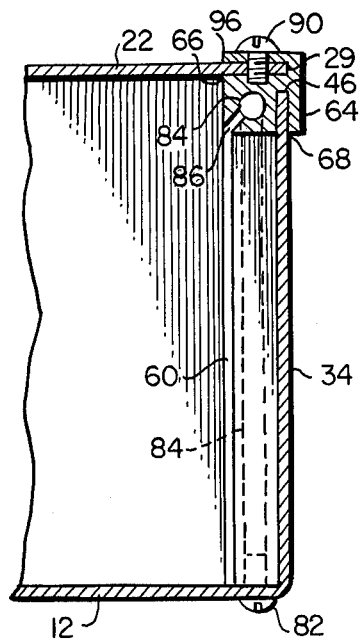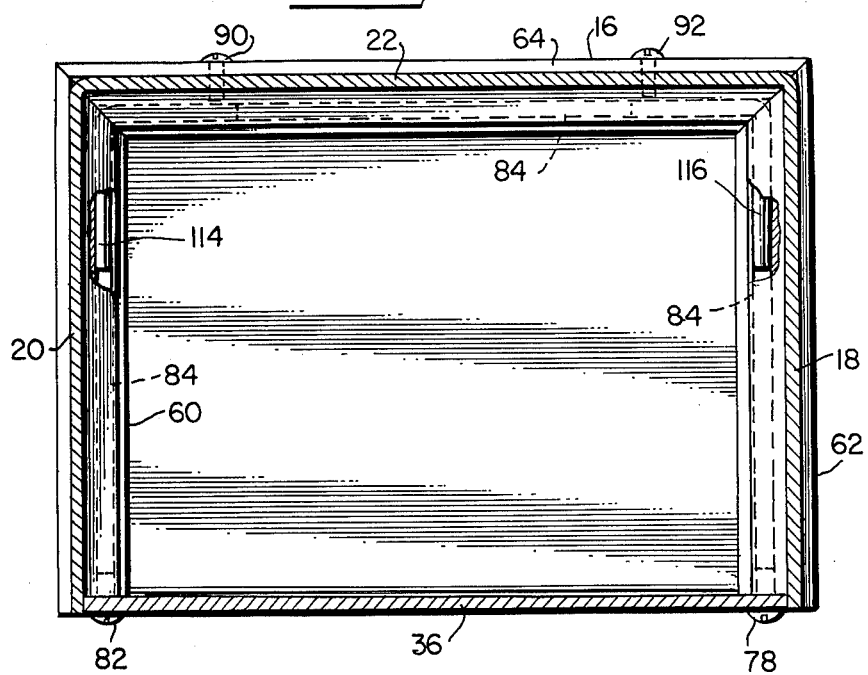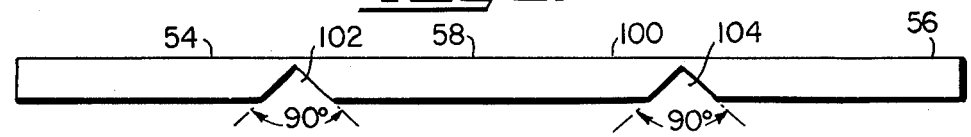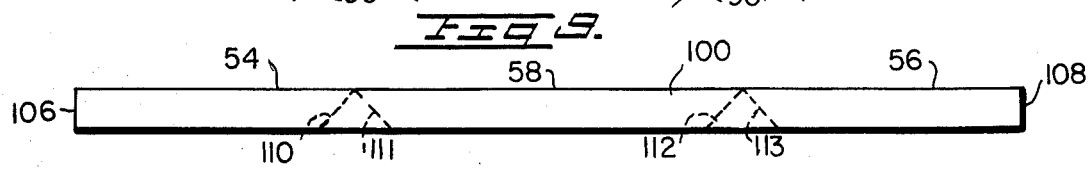

COLLAPSIBLE CONTAINER

BACKGROUND OF THE INVENTION

1. Field of the Invention:

This invention relates to containers and in particular, to an improved collapsible container.

2. Discussion of the prior art:

Collapsible containers are known and have been disclosed in such patents as U.S. Pat. Nos. 1,828,088 and 2,421,225. As disclosed in U.S. Pat. No. 1,828,088, it is advantageous to ship a container in a disassembled condition, the container being assembled after it reaches its point of destination. Other patents disclosing containers are U.S. Pat. Nos. 2,456,929, 2,472,015, 3,316,460 and 3,966,285.

Various shortcomings are associated with the prior art containers. For example, the container disclosed in U.S. Pat. No. 1,828,088 is complicated and difficult to construct while that disclosed in U.S. Pat. No. 2,421,225 is not only difficult to construct but is not sufficiently rigid for many purposes.

SUMMARY OF THE INVENTION

It is thus a primary object of this invention to provide an improved collapsible container which may be shipped in disassembled form which is easily assembled and which is sturdy after it is assembled.

It is a further object of this invention to provide an improved method for assembling such a container.

Other objects and advantages of this invention will be apparent from a reading of the following specification and claims taken together with the drawing.

BRIEF DESCRIPTION OF THE DRAWING

FIG. 1 is an exploded perspective view of an illustrative collapsible container in accordance with this invention.

FIG. 2 is a top plan view of an illustrative assembled container in accordance with this invention.

FIG. 3 is a side elevation view of the container of FIG. 2.

FIG. 4 is an end elevation view of the container of FIG. 2.

FIG. 5 is a bottom view of the container of FIG. 2.

FIGS. 6 and 7 are cross-section views taken respectively along the line 6—6 of FIG. 2 and line 7—7 of FIG. 3.

FIGS. 8 and 9 are side elevational views of an illustrative bar or rod illustrating how the bar may be processed to form U-shaped bracket members employed in the invention.

DETAILED DESCRIPTION OF THE PREFERRED EMBODIMENT OF THE INVENTION

Referring to the Figures of the drawing where like reference numerals refer to like parts, there is illustrated in FIG. 1 an exploded perspective view of a collapsible container in accordance with this invention. The collapsible container basically comprises four parts — that is, cover or first channel-like member 10, chassis or second channel-like member 12 and first and second U-shaped members 14 and 16. The cover 10 has two side members or plates 18 and 20 preferably integrally connected to an intermediate plate or member 22. Further, cover 10 has two open ends one of which is generally indicated at 24 and the other at 25. The open ends each define U-shaped edges where the U-shaped edge defined by open end 24 corresponds to edge 26 of plate 20, edge 28 of plate 22 and edge 30 of plate 18 and the U-shaped edge defined by open end 25 corresponds to edge 27 of plate 20, edge 29 of plate 22 and edge 31 of plate 18.

Chassis 12 comprises two side plates or members 32 and 34 preferably integrally connected to an intermediate plate or member 36. Each of the side plates 32 and 34 define U-shaped edges where the U-shaped edge defined by plate 32 corresponds to edges 38, 40 and 42 thereof while the U-shaped edge defined by plate 34 corresponds to edges 44, 46 and 48 thereof.

Chassis 12 has open ends generally indicated at 50 and 52. Further, the length of chassis 12 extending from open end 50 to end 52 is approximately the same as the width of intermediate plate 22 of cover 10 extending from side plate 18 to plate 20. Also the width of intermediate plate 36 of chassis 12 extending from side plate 32 to plate 34 is approximately the same as the length of cover 10 extending from open end 24 to end 25 thereof. Hence, cover 10 and chassis 12 tend to mate with one another to form an enclosed container.

In order to simply and securely secure cover 10 and chassis 12 together as a collapsible container, U-shaped brackets or members 14 and 16 are employed. In order to better appreciate the structure and function of brackets 14 and 16, reference should be made to FIGS. 2–7. As can be seen in FIG. 1, bracket 14 includes legs 54 and 56 and base 58 while bracket 16 comprises legs 60 and 62 and base 64. The cross-section of the legs 54, 56, 60 and 62 and the bases 58 and 64 is exactly the same and as will be brought out in more detail, the U-shaped members 14 and 16 are preferably formed from a rod-like member having a cross-section such as shown in FIG. 6 where the cross-section of base 64 of U-shaped member 16 is shown. As can be seen, member 64 has a first groove or slot 66 disposed therein and a second groove or slot 68, groove 68 being perpendicularly oriented with respect to groove 66. As can be seen in FIG. 1, groove 66 extends around the entire periphery of U-shaped member 16 as indicated at 66a, 66b and 66c. Groove 68 also extends around the entire inner periphery thereof. As can be seen in FIG. 6, side plate 34 of chassis 12 is disposed within groove 68 when the container is secured together. In fact, edges 44, 46 and 48 of side plate 34 are disposed within groove 68 after the container is assembled. Further, the U-shaped edges 27, 29, and 31 of cover 10 defined by the open end 25 are disposed within groove 66 and, in particular, these edges are respectively disposed within grooves 66a, 66b and 66c.

In assembling the container, one procedure which may be followed is to first fit U-shaped members 14 and 16 over the respective open ends 24 and 25 of cover 10. The procedure would be the same for each U-shaped member where member 16 would be fitted onto cover 10 simply by respectively inserting the edges 27, 29 and 31 into slots 66a, 66b and 66c. The chassis 12 can then be slid into the brackets 14 and 16 by respectively inserting side plate 34 into groove 68 of bracket 16 and side plate 32 into a groove 68a which extends around the inner periphery of U-shaped bracket 14. When assembled, a completely enclosed container results, the different views of which are shown in FIGS. 2–5.

The container may be further secured together by screws 76 through 82 as shown in FIG. 5. These screws clear member 36 of chassis 12 and are respectively threaded into legs 56, 62, 54 and 60 as illustrated in FIG. 5 where, for example, screws 78 and 82 are threaded into a tubular opening 84 which extends around the periphery of bracket 16, as shown in FIG. 7. As can be seen in FIG. 6, a small slot 86 may also extend around the inner periphery of each bracket to facilitate the formation of and access to opening 84.

If desired, the container can be further secured together by screws 88, 90, 92 and 94 as can be seen in FIG. 2. Referring to FIG. 6, a typical screw 90 is illustrated and it clears the upper portion 96 of leg 64 and the intermediate plate 22 of cover 10 and is threaded into the body of leg 64. Alternatively, screw 90 may simply clear portion 96 and be threaded into plate 22. Of course, rivets or the like may also be employed in place of the screws 76–82 or 88–94.

As stated hereinbefore, the container of the present invention is particularly suitable for those applications where it is convenient to ship the container to a remote destination at which place the container is put together. In particular, the container may be shipped in essentially two-dimensional form to thereby effect appropriate economies. Thus, cover 10 and chassis 12 can be shipped as flat pieces of sheet metal or the like and formed as illustrated in FIG. 1 after reaching the point of destination. Similarly, U-shaped brackets 14 and 16 can be formed from a rod-like member or bar 100 as shown in FIG. 8, the cross-section of which would be the same as that shown in FIG. 6. Thus, assuming U-shaped member 14 were to be made from rod 100, 90° notches 102 and 104 would be formed in rod 100 as shown in FIG. 8. The rod would then be simply bent to form the bracket 14 shown in FIG. 1.

Alternatively, bracket 14 could be formed as follows. Pieces 54 and 56 would each be formed by first making a cut completely through rod or bar 58 perpendicular to the longitudinal axis thereof to thereby form edges 106 and 108 as shown in FIG. 9. A pair of slanted cuts 110 and 111 at approximately 45° with respect to the longitudinal axis of rod 100 would then be made to thereby form two discrete members corresponding to legs 54 and 56. A further pair of slanted cuts 112 and 113 at approximately 45° with respect to the longitudinal axis of rod 100 would then be made to thereby form base 58. The members 54–58 could then be secured together by inserting resilient wire connectors into tubular opening 84. A pair of such connectors are indicated at 114 and 116 of FIG. 7. The connectors tightly fit into opening 84 and are bent into an L-shape as the legs of each U-shaped members 14 and 16 are fitted to the respective bases thereof. The connectors may also be used with the FIG. 8 embodiment, if desired.

What is claimed is:

1. A collapsible container comprising
 a first channel-like member of predetermined length having open ends, two side members and an intermediate member of predetermined width extending between the two side members, said first channel-like member having first and second U-shaped edges respectively defined by the open ends of the channel-like member;
 a second channel-like member having two side members with edges and an intermediate member extending between the two side members, said second channel-like member having a first and second U-shaped edges defined by the respective edges of the two side members, the length of said second channel-like member being approximately the same as the said predetermined width of the intermediate member of said first channel-like member and the width of the intermediate member of said second channel-like member being approximately the same as that of said predetermined length of the first channel-like member; and
 first and second U-shaped members, each member having a first groove extending around the inner periphery thereof and a second groove perpendicularly oriented with respect to said first groove and extending around the member,
 said first and second U-shaped edges of said first channel-like member being respectively disposed in the first grooves of said first and second U-shaped members and
 said first and second U-shaped edges of said second channel-like member being respectively disposed in the second grooves of said first and second U-shaped members.

2. A collapsible container as in claim 1 where said first and second U-shaped members each have two legs and a base and said container includes means for fixedly securing said second channel-like member to the respective legs of the first and second U-shaped members.

3. A collapsible container as in claim 1 including means for fixedly securing said first channel-like member to the respective bases of the first and second U-shaped members.

* * * * *